US011930342B2

(12) United States Patent
Liu et al.

(10) Patent No.: US 11,930,342 B2
(45) Date of Patent: Mar. 12, 2024

(54) ELECTRO-ACOUSTIC TRANSDUCER

(71) Applicant: Dolby Laboratories Licensing Corporation, San Francisco, CA (US)

(72) Inventors: Tiezhong Liu, Beijing (CN); Pengcheng Ji, Beijing (CN); Wenjie Gui, Shenzhen (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/777,898

(22) PCT Filed: Nov. 17, 2020

(86) PCT No.: PCT/US2020/060900
§ 371 (c)(1),
(2) Date: May 18, 2022

(87) PCT Pub. No.: WO2021/101897
PCT Pub. Date: May 27, 2021

(65) Prior Publication Data

US 2023/0007402 A1 Jan. 5, 2023

Related U.S. Application Data

(60) Provisional application No. 62/949,170, filed on Dec. 17, 2019, provisional application No. 62/988,183, filed on Mar. 11, 2020.

(30) Foreign Application Priority Data

Nov. 18, 2019 (WO) ................ PCT/CN2019/119167
Feb. 20, 2020 (WO) ................ PCT/CN2020/074808

(51) Int. Cl.
*H04R 9/04* (2006.01)
*H04R 7/26* (2006.01)
*H04R 9/06* (2006.01)

(52) U.S. Cl.
CPC ............... *H04R 9/043* (2013.01); *H04R 7/26* (2013.01); *H04R 9/06* (2013.01)

(58) Field of Classification Search
CPC ............. H04R 9/043; H04R 7/26; H04R 9/06
See application file for complete search history.

(56) References Cited

U.S. PATENT DOCUMENTS 7,433,485 B1 * 10/2008 Diedrich .................. H04R 9/06 381/404
2007/0242850 A1 10/2007 Sumitani

FOREIGN PATENT DOCUMENTS

CN 201774670 3/2011
CN 202856966 4/2013
(Continued)

*Primary Examiner* — Sunita Joshi

(57) ABSTRACT

An electro-acoustic transducer, comprising a supporting frame, a magnet assembly with an annular yoke surrounding a magnet a diaphragm attached to the front edge of the supporting frame, a voice coil suspended by the diaphragm in a gap formed between the magnet and the annular yoke, the voice coil being axially movable with respect to the magnet, and an annular damper arranged to stabilize the diaphragm. The transducer further comprises a damper holder having a substantially flat annular portion attached to the diaphragm, and a conical wall portion surrounding the voice coil, wherein an inner perimeter of the damper is attached to a rear region of the conical wall portion.

9 Claims, 6 Drawing Sheets

(56) References Cited

FOREIGN PATENT DOCUMENTS

| | | | | |
|---|---|---|---|---|
| CN | 103329573 A | | 9/2013 | |
| CN | 104661161 A | | 5/2015 | |
| CN | 206490828 | | 9/2017 | |
| EP | 1515583 A1 | * | 3/2005 | ............... H04R 7/26 |
| EP | 1515583 B1 | | 12/2010 | |
| WO | 1988008239 | | 10/1988 | |
| WO | 2019117706 | | 6/2019 | |

* cited by examiner

ELECTRO-ACOUSTIC TRANSDUCER

CROSS-REFERENCE TO RELATED APPLICATIONS

This application claims priority to PCT Application No. PCT/CN2019/119167, filed Nov. 18, 2019, PCT Application No. PCT/CN2020/074808, filed Feb. 12, 2020, U.S. Provisional Application No. 62/949,170, filed Dec. 17, 2019 and U.S. Provisional Application No. 62/988,183, filed Mar. 11, 2020, each of which is hereby incorporated by reference in its entirety.

FIELD OF THE INVENTION

The present invention relates to an electro-acoustic transducer of the kind having a magnet, a frame surrounding the magnet and fixedly arranged with respect to the magnet, a diaphragm attached to the front edge of the supporting frame, a voice coil suspended by the diaphragm in a gap formed between the magnet and the annular yoke, the voice coil being axially movable with respect to the magnet, and a damper arranged to stabilize the diaphragm, the damper formed as an annular disc with concentric corrugations, an outer perimeter of the annular disc being attached to the frame.

BACKGROUND OF THE INVENTION

A damper, sometimes referred to as a spider, is one important part of an electro-acoustic transducer. The damper helps to stabilize and balance the coil while vibrating. Also, a good damper will help optimize the mechanical compliance of the transducer suspension (Cms) of the vibration system and lower the Total Harmonic Distortion (THD). Conventionally, a damper is designed flat with the peripheral and central bounding areas in the same or substantially the same level along the z-axis. (By z-axis is intended the front-to-rear axis of symmetry of the transducer. Such a flat design will take up a large amount of Z-room to avoid interference with a yoke side wall and a lead wire. It is generally desirable to provide a flat transducer with maintained performance.

Document WO 88/08239 discloses a "shallow" loudspeaker with a generally conical damper. The conical shape of the damper enables a larger excursion without contact between the damper and the yoke. However, the conical damper is less stable than a flat, annular damper. Also, the design in WO88/08239 requires attachment of four components (diaphragm, cover, coil former and damper) along a narrow, ring-shaped intersection.

GENERAL DISCLOSURE OF THE INVENTION

A first aspect of the present invention relates to an electro-acoustic transducer comprising a supporting frame with a substantially circular front edge, a magnet assembly mounted in the frame, the magnet assembly including an annular yoke surrounding a magnet, a diaphragm attached to the front edge of the supporting frame, a voice coil suspended by the diaphragm in a gap formed between the magnet and the annular yoke, the voice coil being axially movable with respect to the magnet, and an annular damper arranged to stabilize the diaphragm, the annular damper being formed with concentric corrugations, an outer perimeter of the annular damper being attached to the supporting frame. The transducer further comprises a damper holder having a substantially flat annular portion attached to the diaphragm, and a conical wall portion extending from an outer perimeter of the annular portion away from the diaphragm and radially out from the annular portion, so that the conical wall portion surrounds the voice coil, wherein an inner perimeter of the damper is attached to a rear region of the conical wall portion.

This aspect of the invention enables an ultra-slim loudspeaker design with maintained performance. The loudspeaker includes a voice coil, a cone (diaphragm), a surround member (frame), and a damper supporting the cone. According to the invention, a damper holder is arranged so that the damper is positioned separately from the voice coil and away from a yoke. The distance between the damper and the voice coil allows the damper to keep a distance from the yoke. The distance avoids contact between the damper and the yoke, allowing greater excursion of the cone during vibration, compared to conventional loudspeakers. The grater excursion allows the loudspeaker to be thinner than a conventional speaker for moving the same amount of air, thus improving low frequency response. Put differently, the invention enables making the transducer thinner at the same excursion level.

It is noted that "front" herein refers to a sound emitting side of the transducer, while "rear" refers to the opposite side. So, for example, the diaphragm is arranged "in front" of the magnet and voice coil. An axis extending front-to-rear is referred to as the z-axis.

By having an annular damper connected to a conical damper holder in this manner, all available space in the z-direction may be used for transducer excursion. Specifically, the voice coil can be lowered until the front portion of the yoke meets the annular portion of the damper holder.

The sloping form of the conical wall provides a suitable surface for attaching the inner rim of the annular damper.

In one embodiment, the innermost corrugation of the annular damper has an open groove facing the diaphragm (and thus a ridge facing away from the diaphragm). This means that the annular damper has an inner rim sloping inwards towards the diaphragm. By designing the slope of the conical wall and the slope of the inner rim of the damper to be similar (or even the same), attachment of the damper to the damper holder is facilitated. This design also increases the space (z-room) between the damper and diaphragm.

The damper holder is preferably made of a different, and stiffer (less elastic), material than the damper itself, which is typically made of a deformable material. This ensures that the conical shape does not introduce non-linearities and instability to the damper. As an example, the damper holder can be made of non-elastic material such as paper, multilayer formed fiber, aluminum, etc. The damper can be made of a highly elastic material, such as rubber, foam or fibric material.

The conical wall of the damper holder is preferably provided with one or several openings, allowing air to escape.

In some embodiments, an end of a wire forming the voice coil extends between the damper holder and the voice coil former, and between the damper holder and the diaphragm, to a location on an outside of the conical wall. The transducer may further comprises a lead wire having a first end electrically connected to the coil wire end, and a second end electrically connected to an electric terminal in the frame.

With this design, the damper holder serves to guide the coil wire along its surface to a location on the outside of the damper holder. The connection point of the lead wire and coil wire is thus located at a distance from the diaphragm, to avoid interfering with the movement of the diaphragm.

The first end of the lead wire may be soldered to the coil wire end on the outside of the conical wall. No soldering is therefore required on the diaphragm, which improves performance and extends the life-time of the soldering joint. The conical wall provides a suitable surface for soldering, especially when the damper holder is made of a stiff material, such as paper.

The diaphragm may be substantially flat, in which case the transducer may be referred to as a flat transducer.

Other advantages over conventional loudspeaker technology are presented in the drawings and corresponding descriptions.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
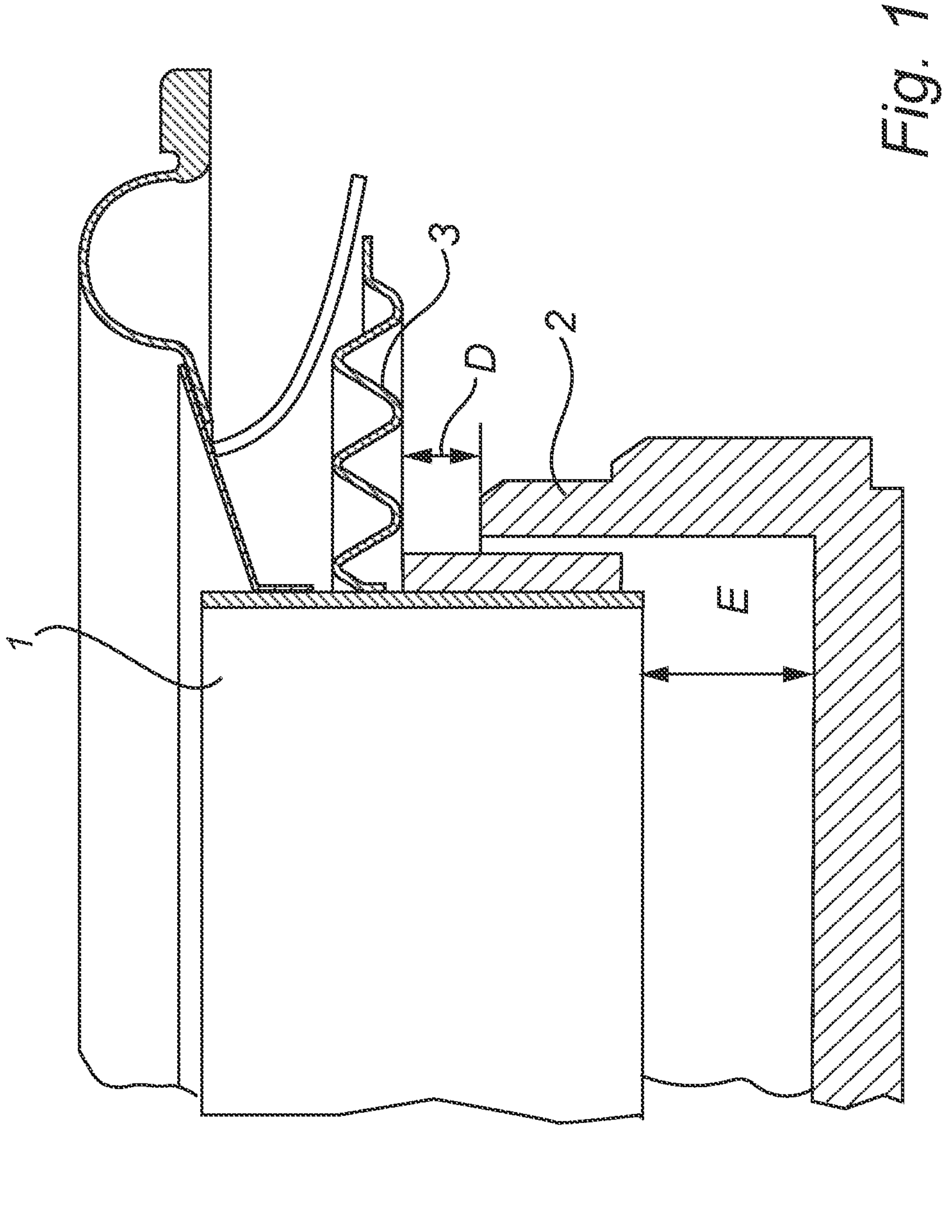
Fig. 1 (Prior Art)
FIGS. 1 and 2 illustrate a conventional speaker design.

FIG. 1 illustrates a conventional speaker design. A voice coil 1 is suspended inside a yoke 2. A damper 3 is connected to the voice coil. Accordingly, excursion E of the voice coil and cone is limited by the distance D between the damper 3 and the yoke 2.

Figure 2:
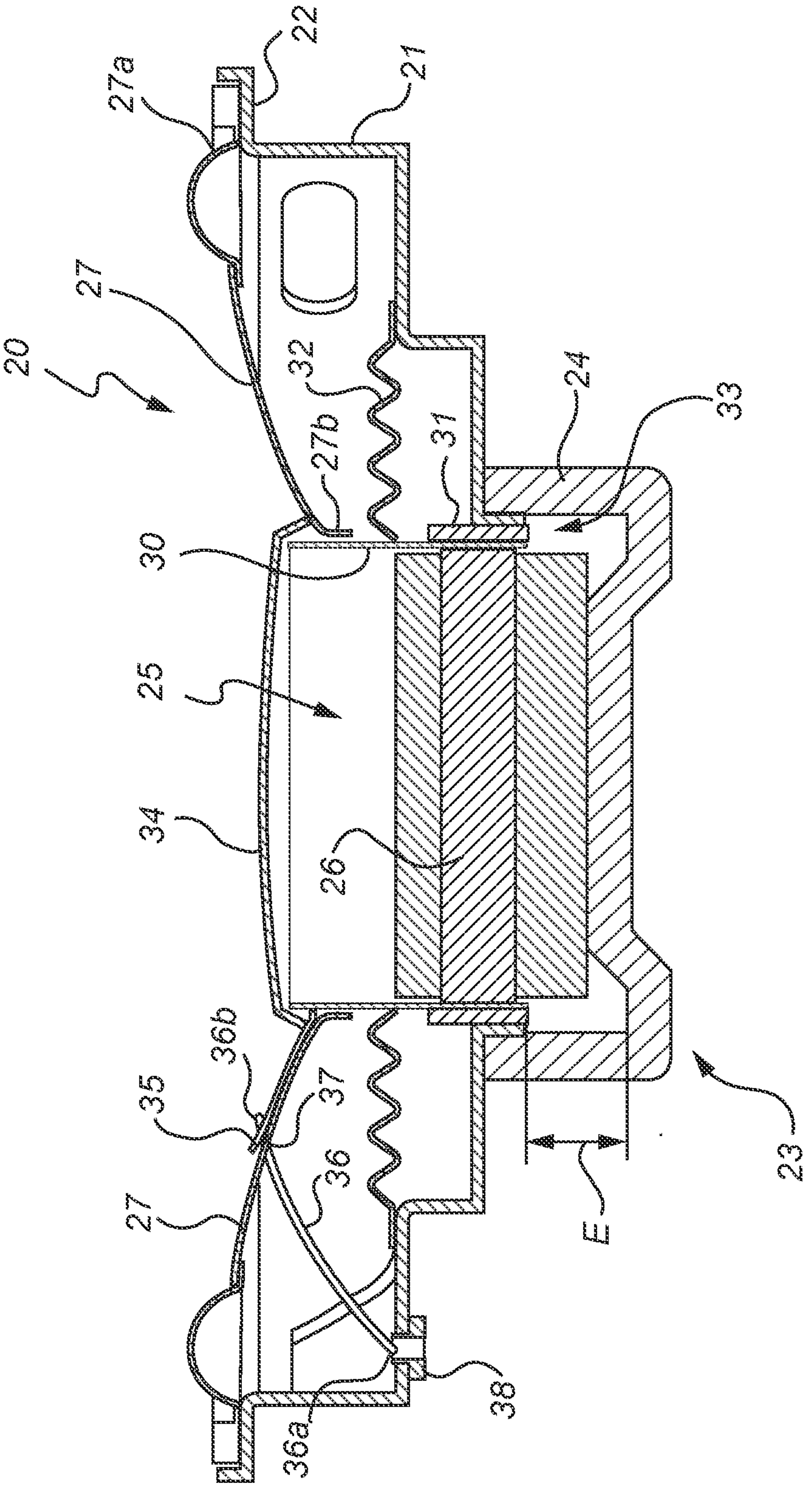
Fig. 2 (Prior Art)

FIG. 2 shows another example of a prior art design. The transducer 20 in FIG. 2 has a frame 21 with a (typically circular) front edge 22. The back side of the frame 21 supports a magnet assembly 23, including an annular yoke 24 and a central pole piece 25 with a permanent magnet 26. An annular diaphragm 27 has an outer suspension 27*a* attached to the edge 22 and an inner perimeter 27*b* attached to a voice coil former 30 on which a coil wire 31 is wound. The voice coil 30, 31 is stabilized by a damper 32 (or "spider") in an air gap 33 formed between the yoke 24 and the pole piece 25. A dust cover 34 is arranged in front of the voice coil former 30.

An end 35 of the coil wire extends between the diaphragm 27 and the voice coil former 30, and then through a gap formed between the dust cover 34 and the diaphragm 27, and ends on top of the diaphragm 27. A lead wire 36 extends through a hole 37 in the diaphragm 27. The lead wire has one end 36*a* connected to an electrical terminal 38 in the frame 21, and another end 36*b* connected, e.g. soldered, to the coil wire end 35. The solder joint is typically covered by a glue.

As FIG. 2 shows, if we want to reduce the total height of the transducer 20 and at the same time keep excursion E as large as possible, we need to reduce the height of the voice coil former 30, but it becomes hard to attach both diaphragm 27 and damper 32 to the voice coil former 30 when this also needs to be reduced in size.

Figure 3:
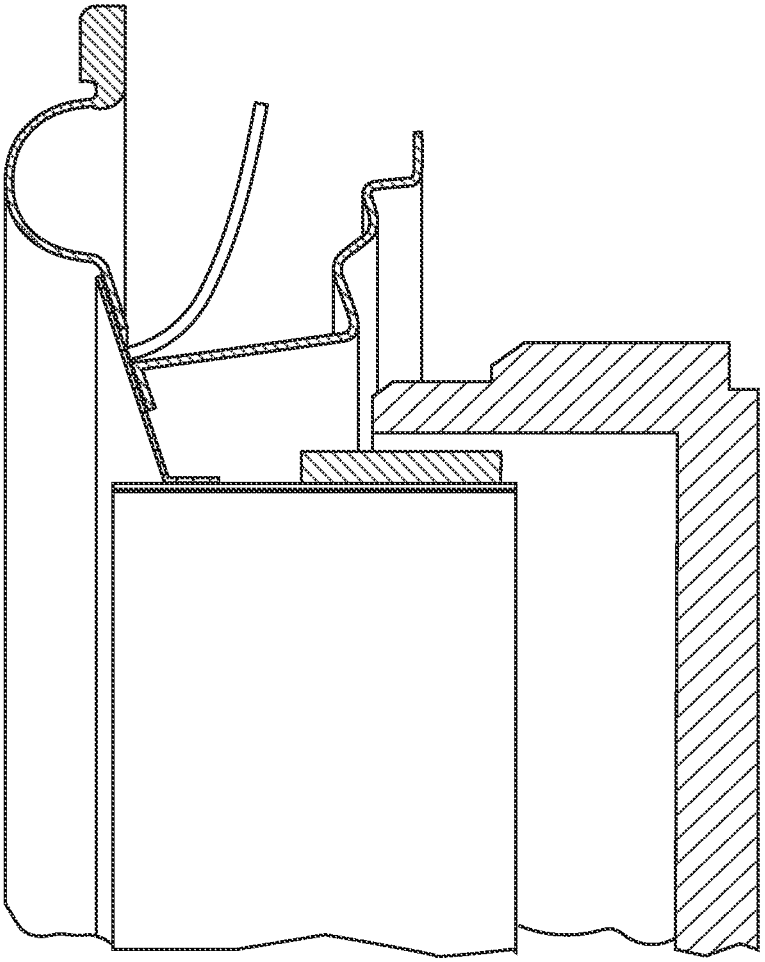
FIG. 3 illustrates an example implementation of a transducer according to the present invention.
Figure 4:
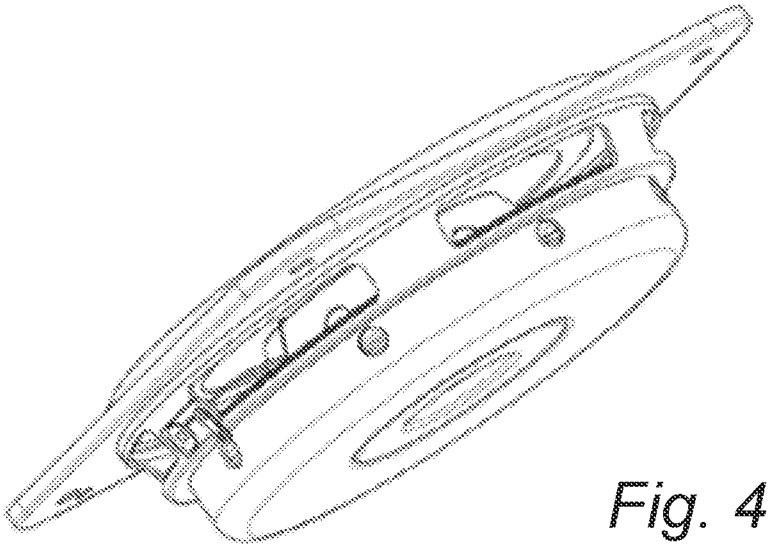
FIGS. 4-6 are perspective views of a transducer according to another embodiment of the present invention.
Figure 5:
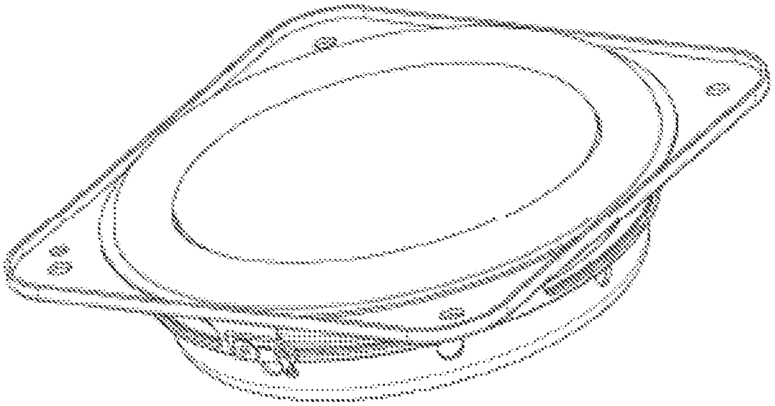
Figure 6:
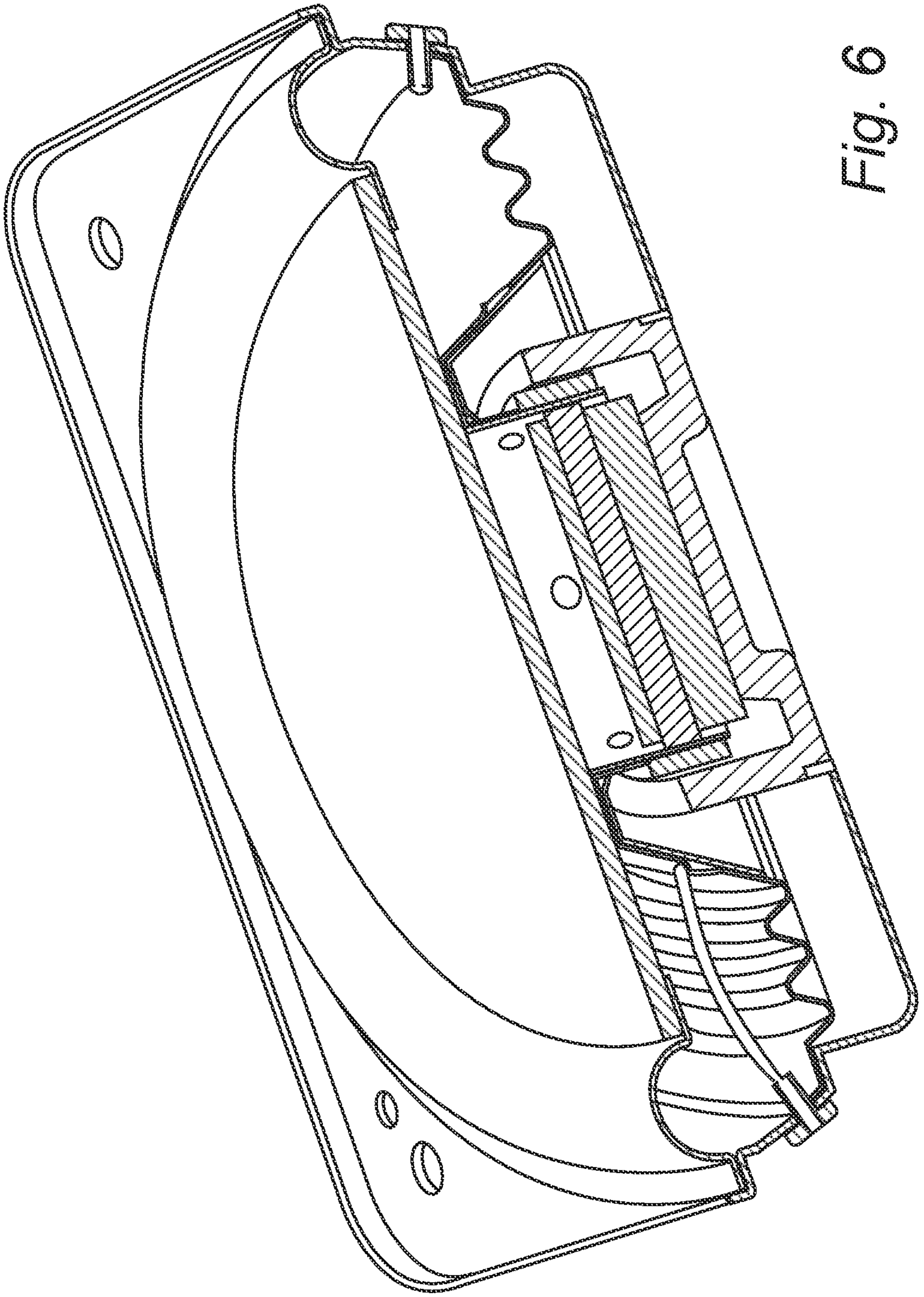

FIG. 3 illustrates an example implementation of an ultra-slim transducer design. The techniques disclosed in this specification include a new design with a damper with special shape to connect cone but still keep the excursion space between cone to yoke, make full use of Z-height. For the ultra-thin transducer it will help to set a larger magnet system inside and more space for the excursion to improve the performance.

FIG. 4-7 illustrate an example implementation of an ultra-slim transducer design.

Similar to the transducer 20 in FIG. 2, the transducer 70 in FIGS. 4-7 has a frame 71 with a front edge 72, a magnet assembly 73 with a yoke 74, and a voice coil including a coil wire 75 wound on a coil former 76. The diaphragm of the transducer 70 includes a rigid cover 77 attached to the front of the coil former, and an annular suspension 78 having its outer perimeter 78*a* attached to the edge 72, and its inner perimeter 78*b* attached to the cover 77. It is noted that the transducer alternatively could have a dust cover which is separate from the diaphragm (e.g. like in FIG. 2).

Figure 7:
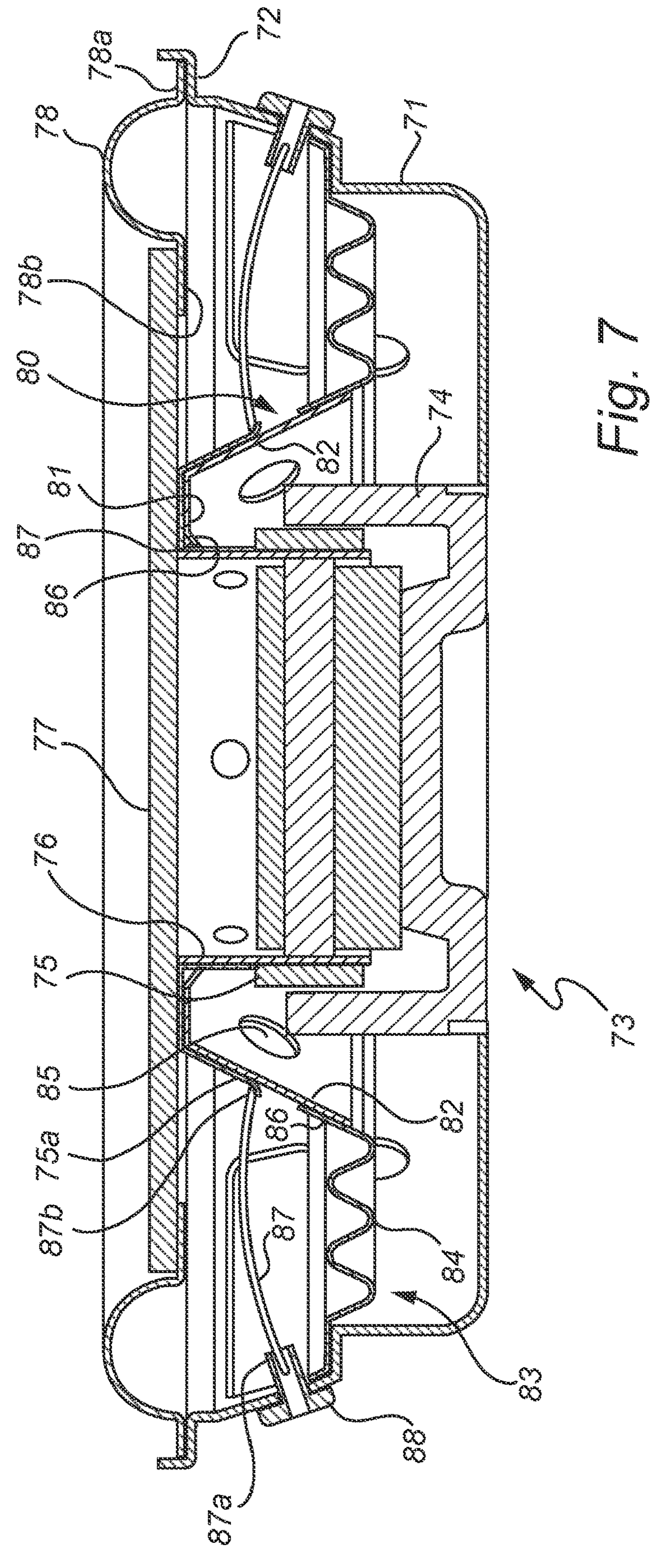
FIG. 7 is a cross section of the transducer in FIGS. 4-6.

As shown most clearly in FIG. 7, the transducer 70 includes a damper holder 80. The damper holder 80 has the shape of a truncated cone, with a generally flat annular portion 81 attached to the inside of the diaphragm, and a conical wall portion 82 extending away from the diaphragm and radially outwards from the annular portion. The conical wall portion thus surrounds the front part of the yoke 74 (i.e. upper part of the yoke in FIG. 7).

The transducer 70 further includes an annular damper 83, formed with a plurality of concentric corrugations 84. The inner perimeter of the damper 83 is glued on (or otherwise attached) to the rear portion of conical wall portion 82 (i.e. lower portion in FIG. 7). The damper holder 80 thereby eliminates the constraint of excursion between the diaphragm and yoke.

The flat annular portion 81 of the damper holder enables reliable attachment, e.g. by glue, to the diaphragm. The annular portion 81 extends radially beyond the front part of the yoke 74, so as to avoid interference between the conical wall portion 82 and the yoke 74 during transducer working. The conical wall portion 82 is provided with openings 85, to allow passage of air.

The innermost region 86 of the annular portion 82 is bent, so as to form a triangular groove 87 next to the coil former 76. The groove may hold glue, thereby making the bind between voice coil former 76 and the damper holder 80/cover 77 more reliable.

The damper holder is preferably made of hardness paper, but other materials with a certain stiffness may also be used.

Damper holder 80 can be manufactured in one procedure and the damper 83 can be pasted on the slope surface of the conical wall portion 82 of the damper holder 83 by using a conventional jig. A conventional producing process may thus be used by the cone paper manufacturer, so that the design in FIGS. 4-7 does not add much cost compared to the traditional design in FIG. 2.

It is noted that the gradient of the conical wall portion 82, as well as the width of the annular portion 81 and size of bent region 86 can be changed to adapt to a different transducer.

The innermost corrugation 84 of the damper 83 has an open side facing the front of the transducer (i.e. upwards in FIG. 7)—and thus a ridge facing the rear (i.e. downwards in FIG. 7). This is sometimes referred to as a "down rolled" structure. As a consequence, the inner edge 86 of the damper has a slope which corresponds to the slope of the conical wall portion 82. A down-rolled structure provides even more space between damper 83 and cover 77.

Damper 83 and damper holder 80 can be designed as one single element, as long as the damper holder 80 is stiff enough.

The cover 77 and diaphragm 78 may have a flat structure to reduce the thickness of the transducer.

The coil wire 75 extends along the outside of the coil former 76, passes between the damper holder 80 and the coil former 76, then extends between the annular portion 81 and the cover 77, and finally ends in a location on the outside of the conical wall portion 82. It is noted that the coil wire is relatively thin, e.g. 0.3 mm, and thus easily fit between the damper holder 80 and cover 77. The transducer 70 further includes a lead wire 87 having one end 87*a* connected to a terminal 88 provided in the frame 71, and another end 87*b* electrically connected (e.g. soldered) to the coil wire end 75*a*.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the scope of the claims. For example, the details of the frame and magnet assembly may be different than those depicted herein. Further, the detailed design of the damper, such as size and number of corrugations, may be different than the illustrated examples.

The invention claimed is:

1. An electro-acoustic transducer, comprising:
  - a supporting frame with a substantially circular front edge,
  - a magnet assembly mounted in the frame, the magnet assembly including an annular yoke surrounding a magnet,
  - a diaphragm attached to the front edge of the supporting frame;
  - a voice coil suspended by the diaphragm in a gap formed between the magnet and the annular yoke, said voice coil being axially movable with respect to the magnet; and
  - an annular damper arranged to stabilize the diaphragm, the annular damper being formed with concentric corrugations, an outer perimeter of said annular damper being attached to said supporting frame;
  - wherein said transducer further comprises a damper holder having a substantially flat annular portion attached to the diaphragm, and a conical wall portion extending from an outer perimeter of the annular portion away from the diaphragm and radially out from the annular portion, so that said conical wall portion surrounds the voice coil;
  - wherein an inner perimeter of said damper is attached to a rear region of said conical wall portion,
  - wherein the voice coil includes a coil wire wound around a cylindrical coil former,
  - wherein one end of said coil wire extends between the damper holder and the voice coil former, and between the damper holder and the diaphragm, to a location on an outside of said conical wall,
  - wherein said transducer further comprises a lead wire having a first end electrically connected to said coil wire end, and a second end electrically connected to an electric terminal in said frame, and
  - wherein the conical wall of the damper holder is provided with one or several openings.

2. The transducer of one of claim 1, wherein an innermost corrugation of said annular damper has an open groove facing the diaphragm.

3. The transducer of claim 1, wherein the damper holder is made of a first material and the annular damper is made of a second material, wherein said first material is stiffer than said second material.

4. The transducer of claim 1, wherein the diaphragm is substantially flat.

5. The transducer of claim 1, wherein the diaphragm includes a rigid cover attached to the front end of the voice coil, and an annular suspension attached between a perimeter of the cover and the front edge of the frame.

6. An electro-acoustic transducer, comprising:

a supporting frame with a substantially circular front edge, a magnet assembly mounted in the frame, the magnet assembly including an annular yoke surrounding a magnet, a diaphragm attached to the front edge of the supporting frame;

a voice coil suspended by the diaphragm in a gap formed between the magnet and the annular yoke, said voice coil being axially movable with respect to the magnet; and an annular damper arranged to stabilize the diaphragm, the annular damper being formed with concentric corrugations, an outer perimeter of said annular damper being attached to said supporting frame;

wherein said transducer further comprises a damper holder having a substantially flat annular portion attached to the diaphragm, and a conical wall portion extending from an outer perimeter of the annular portion away from the diaphragm and radially out from the annular portion, so that said conical wall portion surrounds the voice coil;

wherein an inner perimeter of said damper is attached to a rear region of said conical wall portion, wherein the voice coil includes a coil wire wound around a cylindrical coil former, wherein one end of said coil wire extends between the damper holder and the voice coil former, and between the damper holder and the diaphragm, to a location on an outside of said conical wall, wherein said transducer further comprises a lead wire having a first end electrically connected to said coil wire end, and a second end electrically connected to an electric terminal in said frame, and wherein the diaphragm includes a rigid cover attached to the front end of the voice coil, and an annular suspension attached between a perimeter of the cover and the front edge of the frame.

7. The transducer of one of claim 6, wherein an innermost corrugation of said annular damper has an open groove facing the diaphragm.

8. The transducer of claim 6, wherein the damper holder is made of a first material and the annular damper is made of a second material, wherein said first material is stiffer than said second material.

9. The transducer of claim 6, wherein the diaphragm is substantially flat.

* * * * *